(12) United States Patent
Lewallen et al.

(10) Patent No.: US 8,116,179 B2
(45) Date of Patent: Feb. 14, 2012

(54) SIMULTANEOUS VIEWING OF MULTIPLE TOOL EXECUTION RESULTS

(75) Inventors: Stephen R. Lewallen, San Jose, CA (US); Theodore C. Goldstein, Los Altos, CA (US); Maxwell O. Drukman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1283 days.

(21) Appl. No.: 11/495,272

(22) Filed: Jul. 28, 2006

(65) Prior Publication Data

US 2008/0028370 A1    Jan. 31, 2008

(51) Int. Cl.
*G11B 15/52* (2006.01)
(52) U.S. Cl. ....................................................... 369/47.1
(58) Field of Classification Search .................. None
See application file for complete search history.

(56) References Cited

U.S. PATENT DOCUMENTS

| | | | |
|---|---|---|---|
| 4,445,192 A | 4/1984 | Haag et al. | |
| 4,517,671 A | 5/1985 | Lewis | |
| 5,793,947 A | 8/1998 | Sakamoto | |
| 6,202,199 B1 | 3/2001 | Wygodny et al. | |
| 6,467,052 B1* | 10/2002 | Kaler et al. | 714/39 |
| 6,510,405 B1 | 1/2003 | Gilbertson | |
| 6,556,936 B2 | 4/2003 | Gooding et al. | |
| 6,601,015 B1 | 7/2003 | Milvert et al. | |
| 6,671,829 B2 | 12/2003 | Kaler et al. | |
| 6,697,968 B1 | 2/2004 | Orfali | |
| 6,708,293 B2* | 3/2004 | Kaler et al. | 714/39 |
| 6,769,054 B1 | 7/2004 | Sahin et al. | |
| 6,813,532 B2 | 11/2004 | Eryurek et al. | |
| 6,904,473 B1 | 6/2005 | Bloxham et al. | |
| 6,961,873 B2 | 11/2005 | Dubovsky | |
| 6,961,875 B2 | 11/2005 | Floyd et al. | |
| 6,965,806 B2 | 11/2005 | Eryurek et al. | |
| 6,996,580 B2 | 2/2006 | Bae et al. | |
| 7,003,699 B2 | 2/2006 | Swaine et al. | |
| 7,043,718 B1 | 5/2006 | Au et al. | |
| 7,117,396 B2 | 10/2006 | Komarla et al. | |
| 7,149,933 B2 | 12/2006 | Swaine et al. | |
| 7,177,777 B2 | 2/2007 | Giral et al. | |
| 7,185,234 B1 | 2/2007 | Thekkath | |
| 7,251,584 B1 | 7/2007 | Perazolo et al. | |
| 7,337,365 B2 | 2/2008 | Zunino et al. | |
| 7,380,239 B1 | 5/2008 | Srivastava et al. | |
| 7,398,429 B2 | 7/2008 | Shaffer et al. | |
| 7,434,108 B2 | 10/2008 | Moyer et al. | |
| 7,437,619 B2 | 10/2008 | McCullough et al. | |
| 7,451,357 B2 | 11/2008 | Dickenson et al. | |
| 7,464,301 B1 | 12/2008 | Entezari et al. | |
| 7,702,498 B2 | 4/2010 | Agarwala | |
| 2002/0087949 A1 | 7/2002 | Gloender et al. | |
| 2003/0036872 A1 | 2/2003 | Stark | |
| 2003/0074591 A1* | 4/2003 | McClendon et al. | 713/322 |
| 2003/0088354 A1 | 5/2003 | Wygodny et al. | |
| 2003/0216879 A1 | 11/2003 | Hashemian | |
| 2004/0015879 A1 | 1/2004 | Pauw et al. | |

(Continued)

*Primary Examiner* — Paul Huber
(74) *Attorney, Agent, or Firm* — Van Pelt, Yi & James LLP

(57) ABSTRACT

Facilitating analysis is disclosed. A master track comprising one or more previously recorded inputs to one or more computer system components is played. Two or more sets of instrument output are received, each set generated during at least a corresponding portion of the playback of the master track. At least a selected portion of the instrument output is displayed in a manner that allows visual correlation of the displayed instrument output.

21 Claims, 11 Drawing Sheets

U.S. PATENT DOCUMENTS

| | | |
|---|---|---|
| 2004/0158776 A1 | 8/2004 | McCullough et al. |
| 2005/0021298 A1 | 1/2005 | Junk |
| 2005/0021708 A1 | 1/2005 | Raghuraman et al. |
| 2005/0022068 A1 | 1/2005 | Billeci et al. |
| 2005/0033553 A1 | 2/2005 | Swaine et al. |
| 2005/0273672 A1 | 12/2005 | Konda et al. |
| 2006/0180007 A1* | 8/2006 | McClinsey ............. 84/645 |
| 2006/0248177 A1 | 11/2006 | Dostert et al. |
| 2007/0006173 A1 | 1/2007 | Sohm et al. |
| 2007/0028143 A1 | 2/2007 | Azimi et al. |
| 2007/0150870 A1 | 6/2007 | Fitch et al. |
| 2007/0282542 A1 | 12/2007 | Duff et al. |
| 2007/0294592 A1 | 12/2007 | Ashfield et al. |
| 2008/0016407 A1 | 1/2008 | Abernathy et al. |
| 2008/0288826 A1 | 11/2008 | Nemoto |

* cited by examiner

SIMULTANEOUS VIEWING OF MULTIPLE TOOL EXECUTION RESULTS

BACKGROUND OF THE INVENTION

Typical performance analysis, debugging, and similar tools (hereinafter referred to collectively as "tracing tools" and "monitoring" tools) allow users to visualize data that, e.g., regards one aspect of the behavior of a process. For example, suppose a user is attempting to determine why a particular application that makes use of a remote network is crashing. The user may attempt to detect memory leaks by making use of a first program. To determine whether the problem is instead related to a faulty network protocol implementation, the user must use a different tool and run the application again because the results produced by the first tool are either incompatible with the second tool, and/or because the information determined by the first tool is not easily correlated with the information produced by the second tool. Even if both tools were operated simultaneously, it is possible that they could interfere with one another, causing unreliable results.

Another problem with the aforementioned debugging process is that the user is left to guess whether the problem is the result of a combination of different aspects, such as a memory leak only critical when the network protocol implementation is incorrect.

Additionally, the user must manually and repeatedly execute the process or processes that are being traced and cause the appropriate interactions with the program to occur (such as key presses and file opening operations). If the anomaly only occurs infrequently, such as every one in ten times the application is run, or if the interactions required (e.g., multiple mouse clicks) are cumbersome, the user's attention is more likely to be focused on executing the suspect application and away from the debugging tool.

Therefore, it would be desirable to have a better way to identify anomalies.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
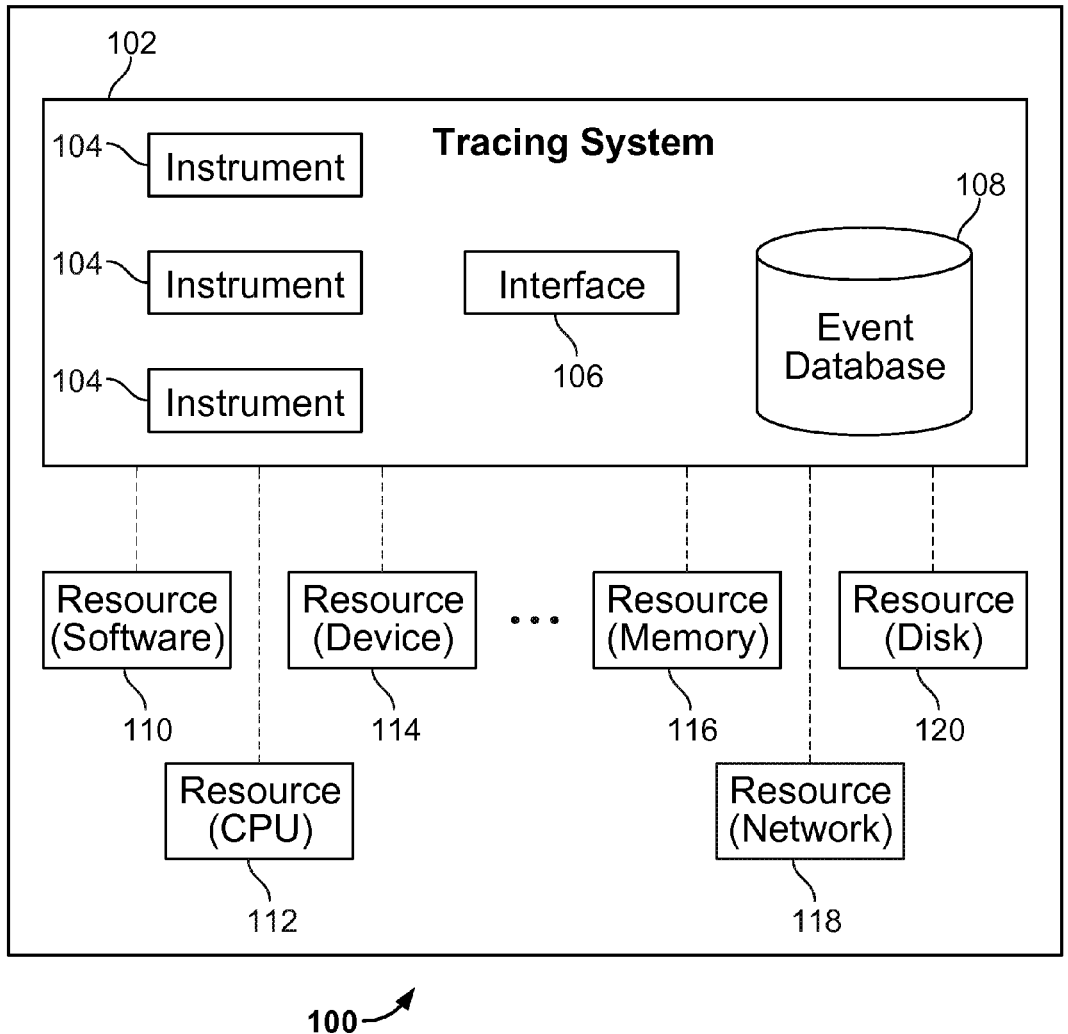
FIG. 1 illustrates an embodiment of a system in which resource tracing is provided.

FIG. 1 illustrates an embodiment of a system in which resource tracing is provided. In the example shown, system 100 includes one or more resources (110-120 in the example shown), including software applications or processes (110) and hardware resources such as a central processing unit (112), optical drives or other devices (114), memory (116), networking resources (118) and storage (120). Tracing system 102 is configured to monitor the behavior of resources 110-120 through one or more instruments 104.

In the example shown, instruments 104 gather information about the resources and store at least a portion of that information in an event database 108. A user, interacting with interface 106, controls the instruments—specifying parameters such as which resource(s) to monitor for which type(s) of and/or range(s) of behavior. As described in more detail below, interface 106 displays to the user the information collected by instruments 104 in a manner that allows the user to visually correlate the information from multiple instruments at the same time.

The term "resource" as used herein refers to any feature of a computing environment that can be monitored by one or more instruments and is not limited to the resources shown in FIG. 1. Other examples of resources include aspects such as power consumption, component temperature, etc.

In some embodiments, the infrastructure provided by portions of tracing system 102 is located on and/or replicated across a plurality of servers rather than the entirety of tracing system 102 being collocated on a single platform. Such may be the case, for example, if the contents of event database 108 are vast.

Figure 2A:
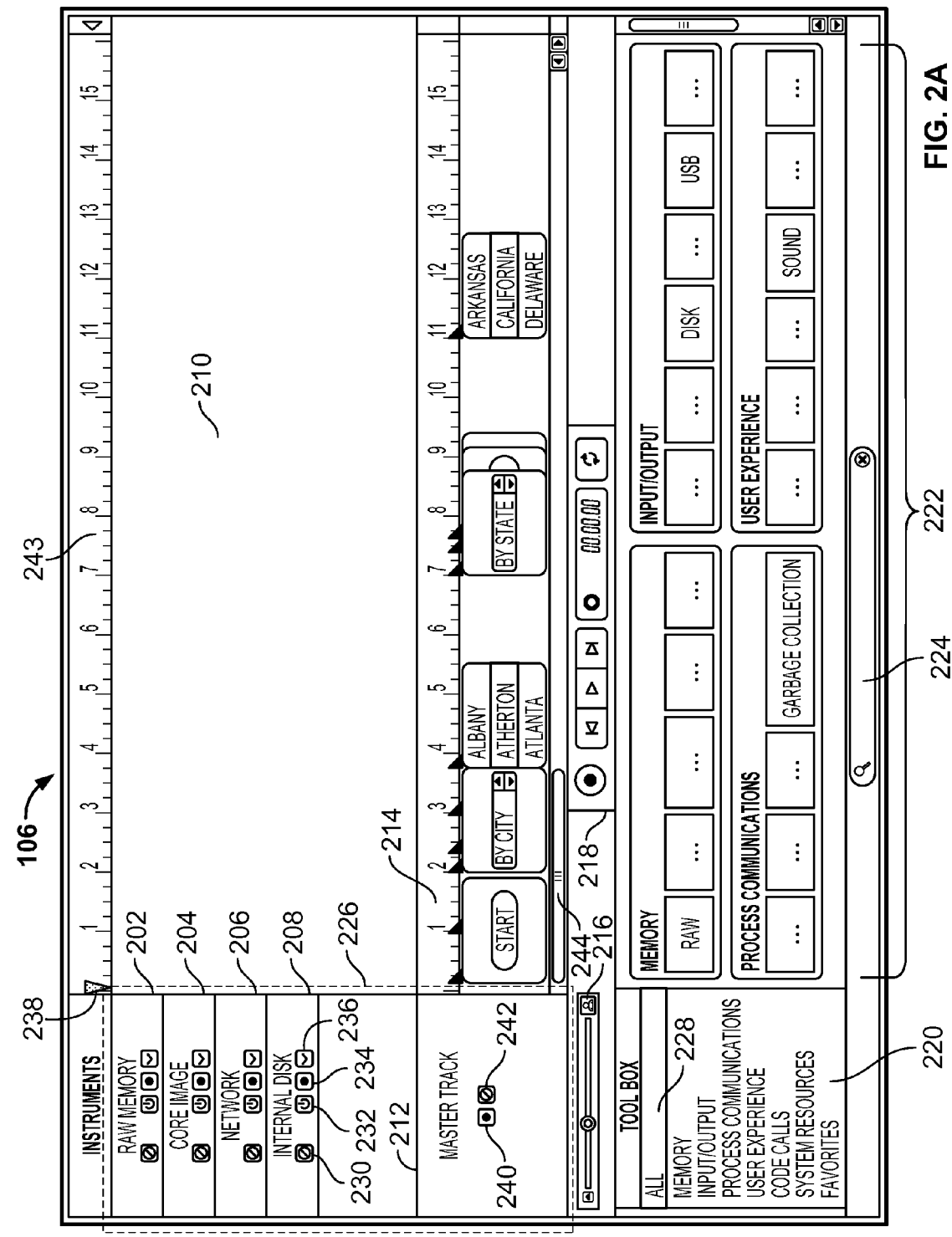
FIG. 2A illustrates an embodiment of an interface to a tracing system.

FIG. 2A illustrates an embodiment of an interface to a tracing system. The example shown is an implementation of interface 106, as rendered in a window.

In the example shown, interface 106 includes an instrument selection tool box 220, from which a user can select one or more instruments. In the example shown, the user has selected to view all available instruments (228) and is presented with such instruments in region 222 accordingly. If the user selected to view a subset of available instruments, such as just those instruments associated with memory or input/output resources, the appropriate instruments would be shown in region 222 accordingly. A user can also search for a particular instrument through the search box displayed in region 224.

A user indicates one or more instruments with which to monitor resources by selecting them as appropriate from region 222, which causes the selected instruments to appear in region 226 of interface 106. In the example shown, a user is attempting to debug an application, "ShowMyPlace.app," which occasionally malfunctions. ShowMyPlace.app is a client server application that, when a user types in an address into a form, retrieves satellite images of the address and surrounding area from an online map server. Occasionally, the application fails to display images, however, it appears to work correctly the majority of the time.

To debug the application, the user has selected to use four instruments (202-208) to monitor resources used in conjunction with the execution of ShowMyPlace.app. One reason that images may be occasionally failing to load is because of a memory fault. The user has selected to use the raw memory instrument (202), a memory analysis tool, accordingly. The problem may also be located within the core image framework, which permits the compositing and manipulation of images. Thus, the user has also selected to use the core image instrument (204). The user has added a network instrument (206) because it is possible that the problem is a drop-off in network traffic. Finally, the user has added a disk instrument (208), in case the problem is that the images being received from the map server are failing to be cached correctly.

Also shown in region 226 is a master track control 212. A user indicates that interactions with one or more computer system components are to be recorded by selecting the record button 240 located in the master track control 212 or the control located in region 218 of interface 106. As used herein, the terms "component" and "computer system component" refer to one or more hardware, software, or combined hardware and software components and/or modules of a computer system, and may in some embodiments include a set of sub-components and/or sub-modules distributed over more than one physical computer system or "box". Examples of computer system components include, without limitations, software applications and/or modules, other processes, and hardware devices such as network interface cards, processors, and input devices such as a mouse or keyboard. Typically, the interactions with the one or more computer system components are ones that the user believes that, when taken at least some of the time, lead to one or more anomalies. Interactions—e.g., user gestures or other input made by a user, application, process, system, etc. via an input device and/or interface, and/or the direct or indirect effect and/or consequences of such inputs on the one or more computer system component(s) and/or other components of a monitored system—are displayed as they occur in time in region 214 of interface 106, also referred to herein as master track 214. The master track can be erased, e.g., by selecting erase button 242 of interface 106. Additional operations on the master track, such as pausing, replaying, and looping the master track can also be taken through the controls shown in region 218.

Time bar 243 and time marker 238 are used to correlate information shown in region 210 (including master track 214). By sliding zoom control 216, the user can specify the time increments displayed by time bar 243 and by sliding view control 244, the user can specify the slice of time for which information is shown in region 210.

Each of the instruments listed in region 226 includes one or more controls, such as controls 230-236. With them, the user can specify aspects such as whether to remove the instrument from the list of selected instruments (230) and whether the instrument should be monitoring all, none, or a portion of the resource(s) (232, 234 and described in more detail below). Also as described in more detail below, if the user causes the activity recorded in the master track to be run multiple times, in various embodiments the user can specify whether or not to show instrument information for each of the runs, for a particular run of interest, for a most recent run, for a current run, and/or concurrently for any one or more past and/or current runs by, e.g., selecting the appropriate drop-down control (236).

In the example shown, the user has recorded one set of interactions with ShowMyPlace.app, each represented in master track 214 by a marker. For example, approximately two seconds after starting the ShowMyPlace.app application, the user gave mouse control to a "By city" dropdown in anticipation of selecting the user's city from a list. Approximately 3.75 seconds after starting the application, the user selected "Atherton" as the city in which the user lives. At approximately 10.75 seconds after starting the application, the user selected "California" from a dropdown.

When the user selects the play control from region 218, the interactions recorded in master track 214—e.g., a sequence of user gestures and/or inputs—will be provided, without any additional actions on the part of the user, to ShowMyPlace.app. Additionally, and as described in more detail below, the selected instruments (202-208) will capture and display output in region 210, in the form of one or more tracks corresponding with each run for each instrument.

Figure 2B:
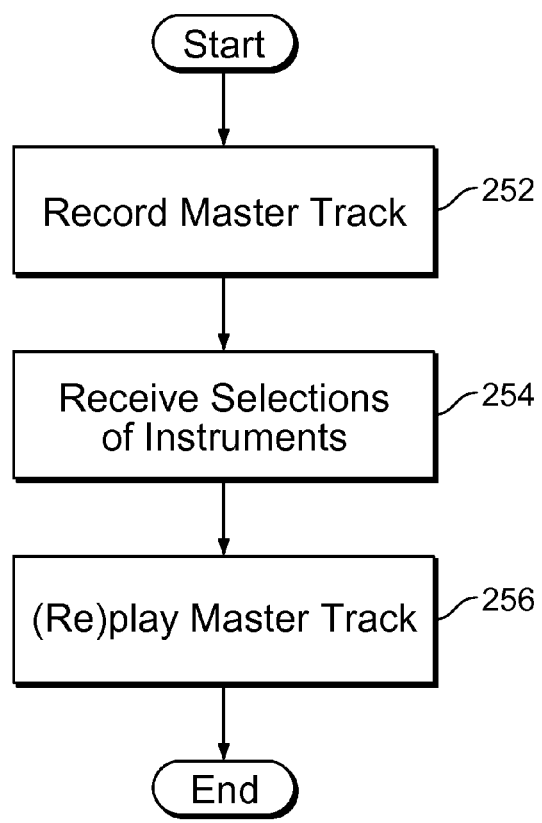
FIG. 2B is a flow chart illustrating an embodiment of a process for playing a master track.

FIG. 2B is a flow chart illustrating an embodiment of a process for playing a master track. The process begins at 252 when a master track is recorded. In some embodiments, the master track is recorded with respect to a single application, such as the ShowMyPlace.app application for which a master track was recorded at 252 as described in conjunction with FIG. 2A. A master track capturing a work flow that includes multiple applications can also be recorded at 252. For example, suppose that whenever a user attempts to view an email attachment in a mail client with an external viewer, the attachment is corrupted. In such a scenario, the master track recorded at 252 will include interactions with both the mail client application, as well as the external viewer application.

At 254, one or more instrument selections is received. For example, when the user selects instruments by interacting with region 222 shown in FIG. 2A, those selections are received at 254.

In some embodiments, collections of instruments are pre-selected into one or more templates that are loaded at 254, rather than or in addition to selecting individual instruments in region 222. Templates may be specifically composed, e.g., to identify and seek out particular problems. For example, in some embodiments custom templates are defined that bundle tools most applicable to particular applications that a company produces. Thus, in the case of a word processing application, performance related instruments such as those monitoring CPU usage, memory consumption, etc. may be preselected in a template, while networking instruments are not. In the case of a web browser application, network, image manipulation, and disk usage instruments may be included in a template, while an instrument to monitor interfaces such a universal serial bus (USB) interface are not.

In some cases, templates include collections of instruments related to a particular category of resource. For example, templates may exist for each of the subsets listed in tool box 220 (e.g., input/output, user experience, etc.)

Figure 2C:
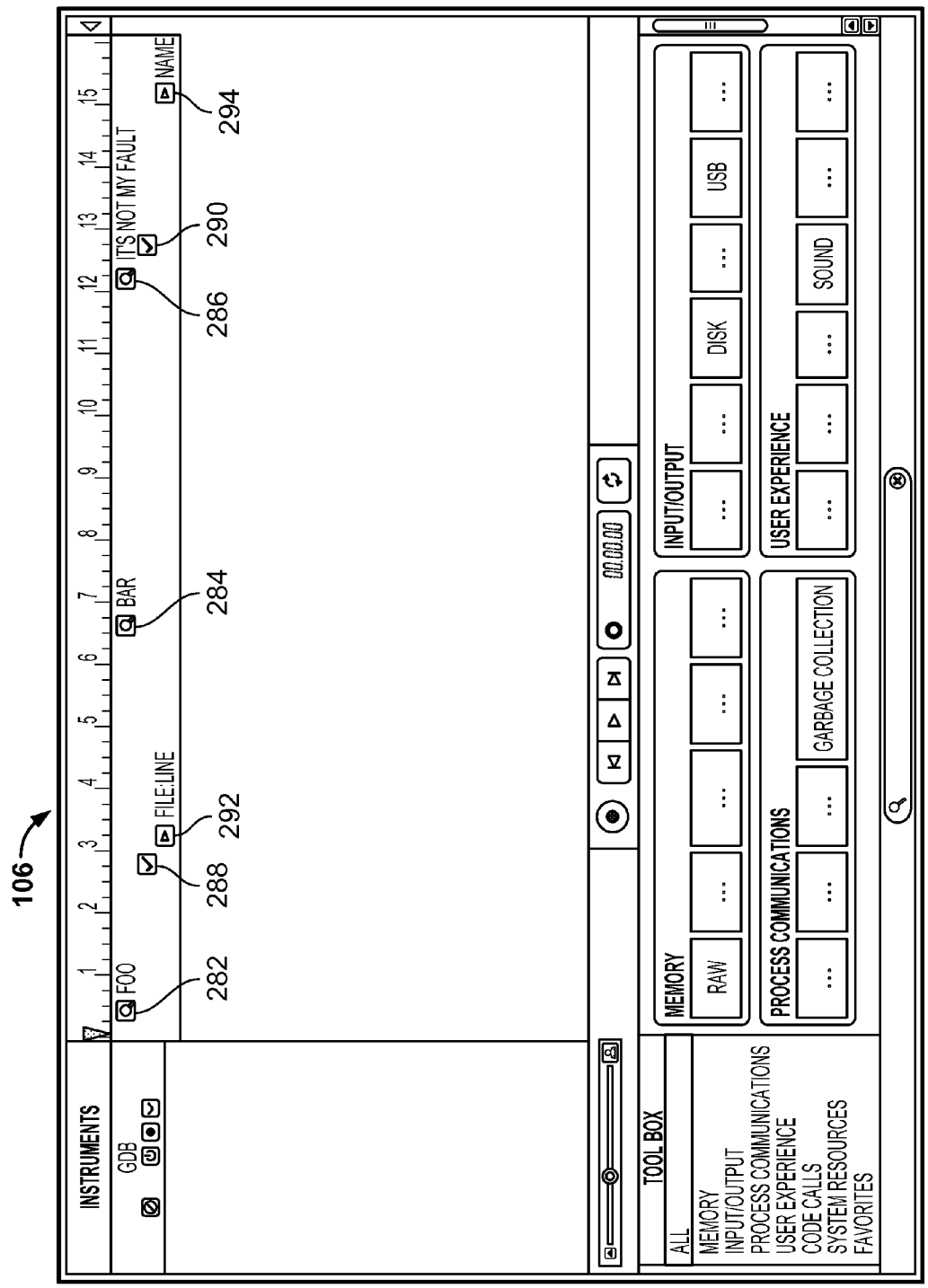
FIG. 2C illustrates an example of a debugger instrument.

In some embodiments, users or other third parties are permitted to create their own instruments, such as by adapting existing tools such as performance analysis tools and debuggers to conform with an applicable instrument application programming interface (API) to tracing system 102. For example, by including a battery life instrument and instruments that, e.g., track the brightness of a screen, the number of times information is written to disc, and the usage of a network card, a user will be more readily able to correlate battery depletion with its precise cause or causes. By including debugging information in tracing system 102, the user will be able to visually discover, e.g., how much memory is allocated between two break points, when a particular variable changes, etc. FIG. 2C illustrates an example of a debugger instrument. The instrument makes use of the GNU debugger, GDB. In the example shown, watchpoints 282, 284, and 286 indicate where variables have changed. Checkpoints 288 and 290 represent points to which the debugger can be rewound. Breakpoints 292 and 294 indicate points in time when the debugger was stopped.

At 256 in FIG. 2B, the track recorded at 252 is replayed. In the example shown in FIG. 2A, at 256 tracing system 102 would cause the ShowMyPlace.app application to execute, feeding to the application the appropriate user interactions (such as selecting options from a drop down menu) as previously recorded at 252. As described in more detail below, also at 256, any instruments configured to monitor one or more resources do so during replay of the activity recorded at 252, and their respective outputs are displayed, such as in region 210 of FIG. 2A.

In some embodiments, the master track recorded at 252 is recorded by a first user and played back at 256 by a second user. Such may be the case, for example, in a quality assurance scenario or customer support scenario in which a first user records the occurrence of an anomaly, but the debugging process is ultimately be performed by a second user. Additionally, in some embodiments, recording the master track at 252 and playing it back at 256 occur at non-contemporaneous times. For example, a user attempting to debug a program on a Friday afternoon may record and save the master track, but then replay the master track (resuming the debugging project) Monday morning. Similarly, in some embodiments, recording the master track is a continuous process—for example, 24 hours worth of information is recorded and stored at 252 at any given time and space is made by overwriting the recorded track as needed.

Figure 3:
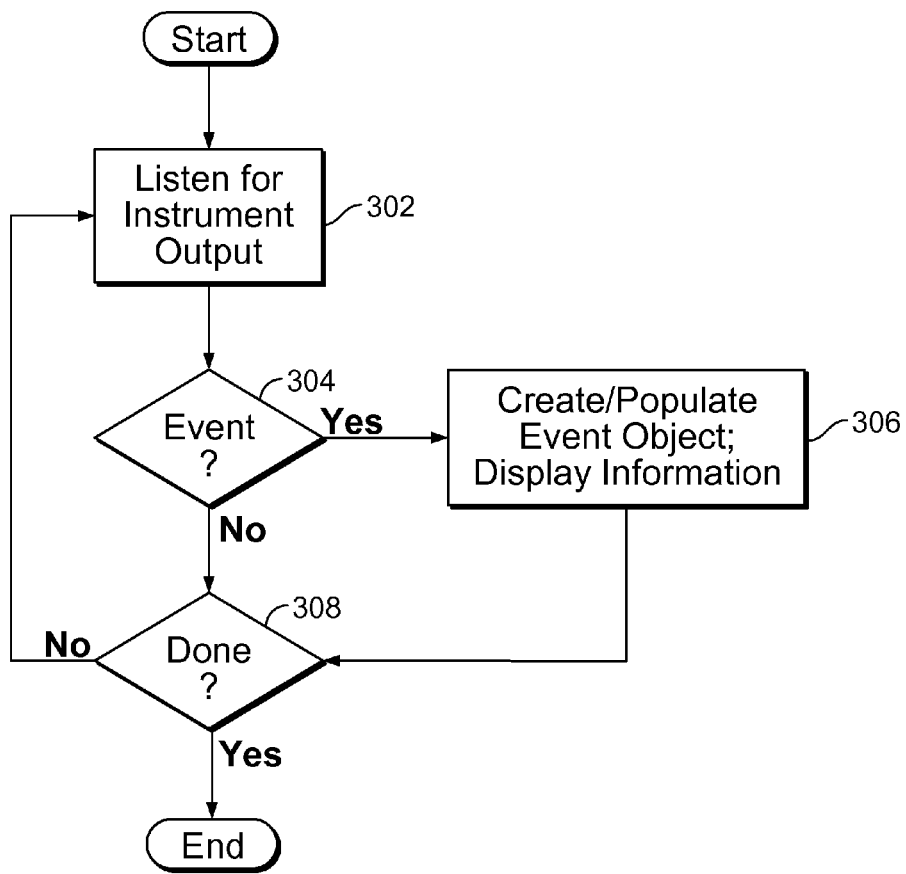
FIG. 3 is a flow chart illustrating an embodiment of a process for recording and displaying event information.

FIG. 3 is a flow chart illustrating an embodiment of a process for recording and displaying event information. The process shown in FIG. 3 may be used to implement a portion of the processing performed at 256 of FIG. 2B.

At 302, the output of one or more instruments is listened for. In the example shown, the instruments listened for are those received in portion 254 of the process shown in FIG. 2B. As described in more detail below, which instrument output is listened for at 302 can be configured with finer granularity in some embodiments.

In some embodiments, instruments indicate that events for which they are configured to monitor are occurring by producing an appropriate output. In the example described in conjunction with FIG. 2A, the ten user interactions recorded in master track 214 are associated with causing potentially millions of events to occur in environment 100.

In some embodiments, when an event is observed by an instrument (304), the event is stored in event database 108 as an event object (306). Each event object includes certain common types of meta-information such as a field indicating the time at which the event occurred, the type of event, stack trace, in which process the event occurred, and on which CPU the event occurred.

Event objects in some embodiments can be configured to include and/or to include selectively for certain instruments extended data fields which are populated by the instrument with instrument-specific information. For example, when a file access event is observed, in addition to the common fields being populated at 306, information such as what changes were made to the file, which application was responsible for the changes, etc., are also stored. Also at 306, information received from instruments is rendered and displayed to the user through interface 106 as appropriate.

In some cases, the same event is observed by multiple instruments. For example, and as described in more detail below, the two instances of the same instrument may be tuned (scoped) differently. A first file access instrument may be scoped to only listen for file access associated with text files, whereas a second file access instrument may be scoped to listen for all file accesses. Whenever a text file is accessed, both instruments will see the same event and each will record and/or otherwise provide independently of the other output associated with the event. In some embodiments, two instruments that respond to the same event each may supply their own custom meta-information for the event. In some embodiments, events are correlated, if such correlation is recognized during master track playback and/or at runtime, and a single event object used to represent a particular event. Each instrument then instantiates and populates with its own instrument-specific data for the event an instrument-specific event object that is then linked to the main, common object representing the event in the tracing system. In some embodiments, each instrument sub-classes the main event object and adds additional attributes as required to store instrument-specific data about the event. In some such embodiments, such sub-classed event objects share the same timestamp as the main event object, and the timestamp is used to correlate the main and instrument-specific event objects.

The process ends at 308 when activity associated with the playback of master track 214 ends. As described in more detail below, if only a portion of master track 214 has been selected for playback, the process shown in FIG. 3 ends when activity associated with the scoped portion of master track 214 completes.

Figure 4A:
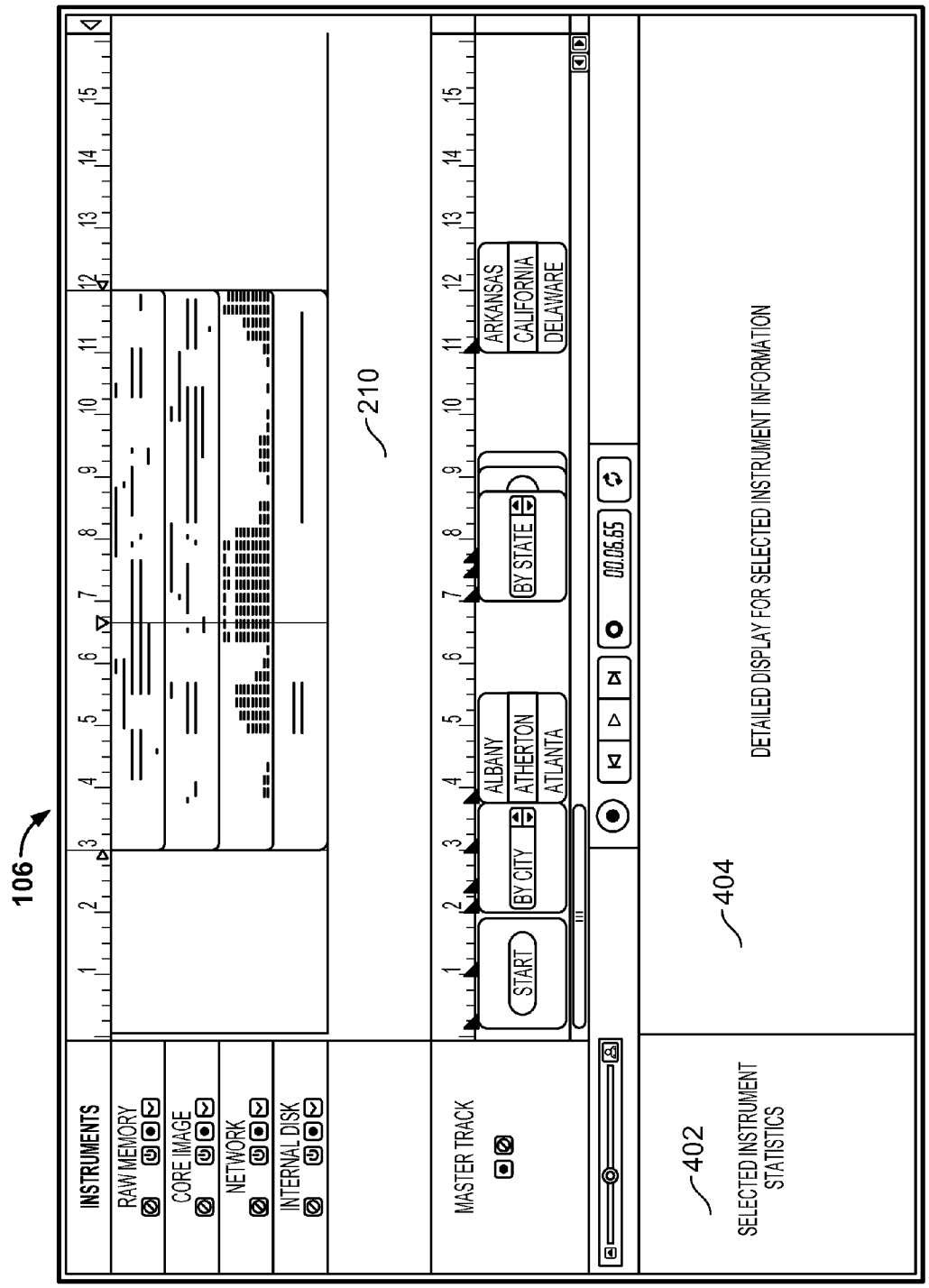
FIG. 4A illustrates an embodiment of an interface to a tracing system.

FIG. 4A illustrates an embodiment of an interface to a tracing system. In the example shown, a user has replayed master track 214, which was recorded at 252 of FIG. 2B. While replay has finished in the example shown in FIG. 4A, the same interface is used in some embodiments to display instrument readings in real time during replay of the master track. Output from each of the four instruments received at 254 of FIG. 2B is shown in region 210 of interface 106. The information is shown rendered in a variety of formats. For example, the equalizer-style brush employed by the network instrument quickly indicates peak consumption of network resources by coloring spikes in network traffic differently from typical values. Similarly, brushes can make use of the vertical axis to indicate information such as multiple threads and depths of calls. For example, in the case of a dual CPU environment, a CPU instrument may display the CPU usage of each respective CPU in one of two parallel tracks. File opens can be represented with indicators occurring in the top half of a track, with file closes represented in the bottom half, etc.

In some cases an instrument may only support a single brush or type of view. In other cases, a user may select different views of the same information, such as by right clicking on the information shown in region 210 or by selecting an instrument control. Other examples of brushes include flowing graphs, histograms, timelines with flags, and thumbnails of the user interface associated with the application or applications being monitored (such as in the case of the master track).

The information shown in a track in region 210 will typically be a very high level view of information collected by the track's respective instrument. Individual pixels may represent one or more events. A user can select to view instrument specific detail for each instrument as applicable. For example, time marker 238 is currently located at 6.65 seconds. If a user clicks on a particular instrument, such as the internal disk instrument, information such as statistics associated with the internal disk instrument will be displayed in region 402 of FIG. 4A. In the case of the internal disk instrument, such statistics may include the number of total files opened or closed, number of files written, etc.

Also upon selection by a user of an instrument, a detailed view of disk-related events occurring at/around 6.65 seconds into the execution of ShowMyPlace.app will be rendered in region 404 of interface 106. For example, the specific names of files open at time 6.65 may be displayed in region 404 and/or particular blocks or sectors in use. In some embodiments, what detail to show (e.g., just file names) is customizable. For example, in the case of a debugger instrument such as GDB (the GNU debugger), one detail view may include the name of the person responsible for committing the portion of code currently executing, whereas another detail view may show the source code itself.

Figure 4B:
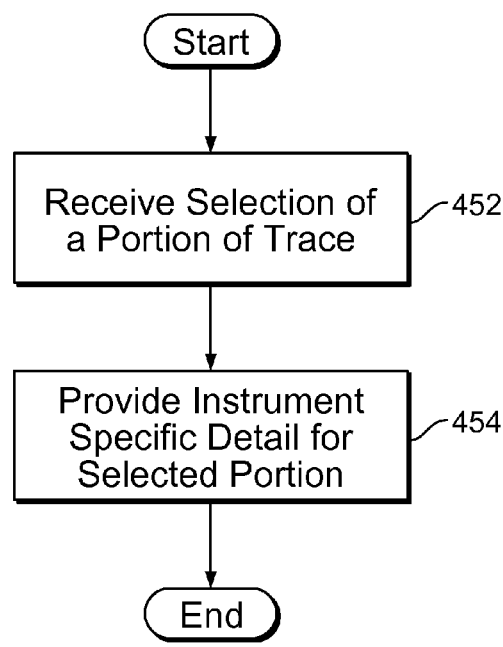
FIG. 4B is a flow chart illustrating an embodiment of a process for displaying detail.

FIG. 4B is a flow chart illustrating an embodiment of a process for displaying detail. The process begins at 452 when an indication is received that a portion of a trace has been selected. For example, suppose a user has set time marker 238 shown in FIG. 4A to 6.65 seconds and double clicked on internal disk. At 452, a selection of "6.65 seconds" and "internal disk" would be received. Suppose instead that a user had selected a larger portion of the internal disk track at 452, such as by dragging time marker 238 or entering a range (via a begin and end time) into interface 106. In such case, a range such as "6.65-6.90" seconds and "internal disk" would be received at 452.

At 454, instrument specific detail for the portion of the trace specified at 452 is displayed, such as in region 404 of interface 106 as shown in FIG. 4A.

Figure 5:
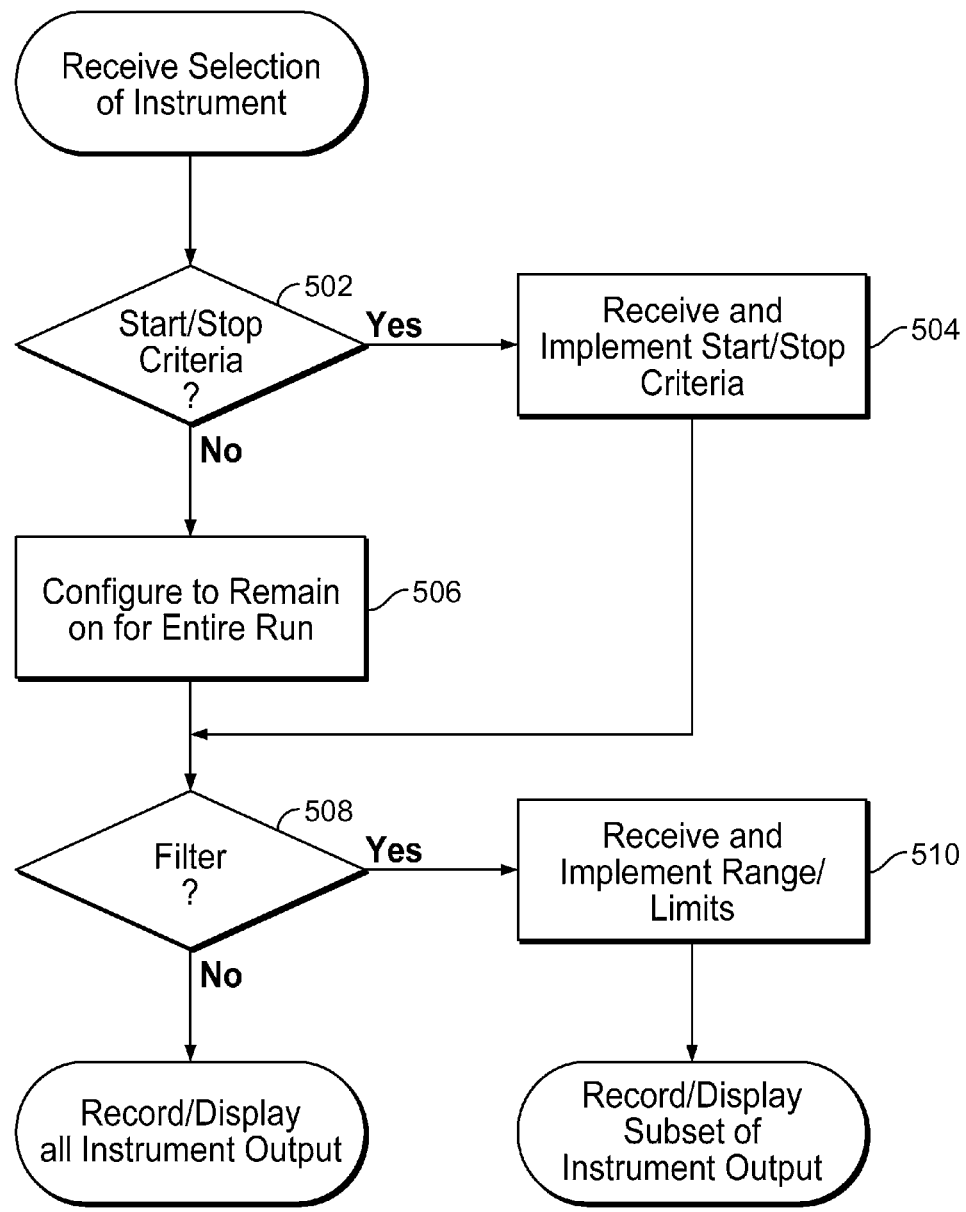
FIG. 5 is a flow chart illustrating an embodiment of a process for scoping an instrument.

FIG. 5 is a flow chart illustrating an embodiment of a process for scoping an instrument. The process begins at 502 when it is determined whether any selected instruments have associated start or stop criteria. In the example shown in FIG. 4A, the instruments have been "scoped." They were each instructed to begin monitoring for events at three seconds into runtime. One reason for scoping instruments is to avoid recording unnecessary information. Often, a great deal of extra information is generated at the beginning of the execution of an application. By instructing the instruments to ignore the first few seconds of runtime, unwanted noise can be reduced accordingly. Thus, in the example shown in FIG. 4A, at 504, an indication that a start criteria (start all instruments at 3 seconds) was received at 504. A stop criteria was also received at 504 in the example shown in FIG. 4A (stop all instruments at 12 seconds).

Other criteria instead of or in addition to time can be used to scope the starting and stopping of an instrument. For example, a first instrument can be scoped to turn on or turn off based on the output of a second instrument. If the temperature rises above a certain amount (as determined by a temperature instrument), a power consumption instrument or a fan usage instrument can be activated by tracing system 102. Similarly, a memory analysis instrument can be configured to turn on when a particular file is opened and to turn off when it is closed.

The start/stop criteria tested for at 502 can also be indicated in conjunction with the master track. For example, at 502 in the example shown in FIG. 4A, the instruments could also be instructed to start recording after the user has given mouse focus to the "by city" dialogue box, and thus also avoiding the initial noise of application startup.

At 506, if no start/stop criteria is received at 502, the instrument is instructed to remain on. Scoping can also include having an instrument ignore particular events or types of events even while on. At 508 it is determined whether one or more filters ought to be applied to the events observed by the instruments (whether on for the entire playback (506), or on for only a portion of the playback (504)).

Examples of filters that can be received at 508 include instructions to monitor for file accesses only where the file is of a particular type. Filters can also be set that cause the instrument to mark when particular events occur. For example, a user can configure the internal disk instrument to display a flag in interface 106 whenever a particular file exceeds a particular size or whenever a file having a prefix of "tmp-" remains open for longer than ten minutes. If a filter is received, at 510 the applicable limits are implemented and the instrument records and displays the appropriate subset of output as applicable. If no filter is received, all instrument output is recorded and displayed for the duration of the time that the instrument is configured to be on.

Figure 6:
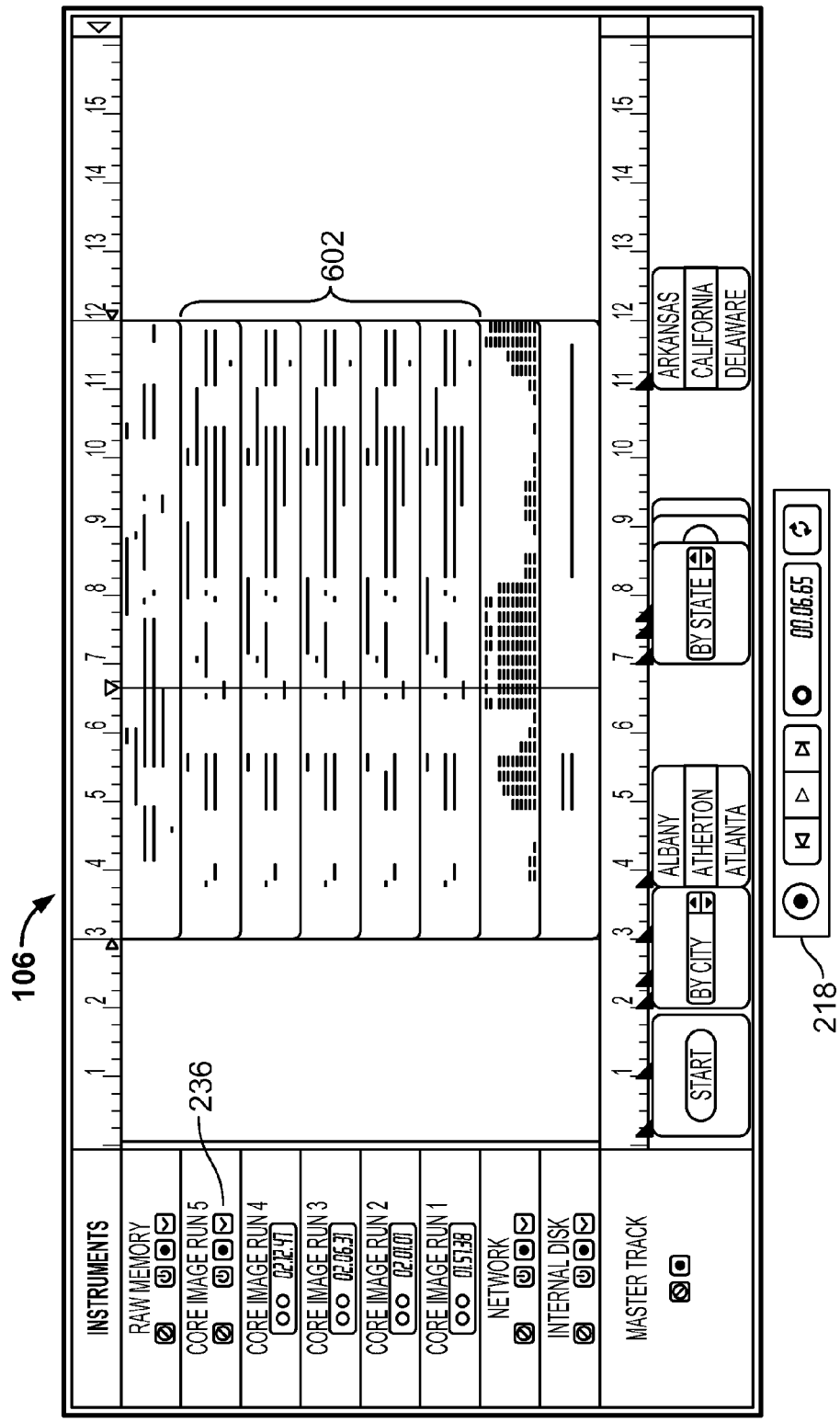
FIG. 6 illustrates an embodiment of an interface to a tracing system.

FIG. 6 illustrates an embodiment of an interface to a tracing system. The example shown is a representation of interface 106 as rendered after the master track recorded at 252 of FIG. 2B is replayed five times. The user has selected to view the output of all five runs as recorded by the core image instrument (602) by selecting drop down 236. The raw memory, network, and internal disk output shown is from the most recent run in the example shown and in various embodiments is configurable by the user (such as by allowing the user to see the first run, an average across all five runs, all five runs concurrently, etc.)

In the example shown, the master track was played five times because the user selected the "play" button from controls 218 a total of five times. Other methods may also be used to indicate that multiple runs of the master track are to be played, such as by entering the number of times the master track ought to be played into a dialogue, or by making use of the "loop" control shown at 218. In the example shown, additional information is presented to the user when drop down 236 is selected. This information includes the total amount of processing time spent on image-related resources. As shown, at each run, the core image instrument recorded different lengths of image processing time, with the first run consuming the least amount of time and the fourth run consuming the most amount of time.

Figure 7A:
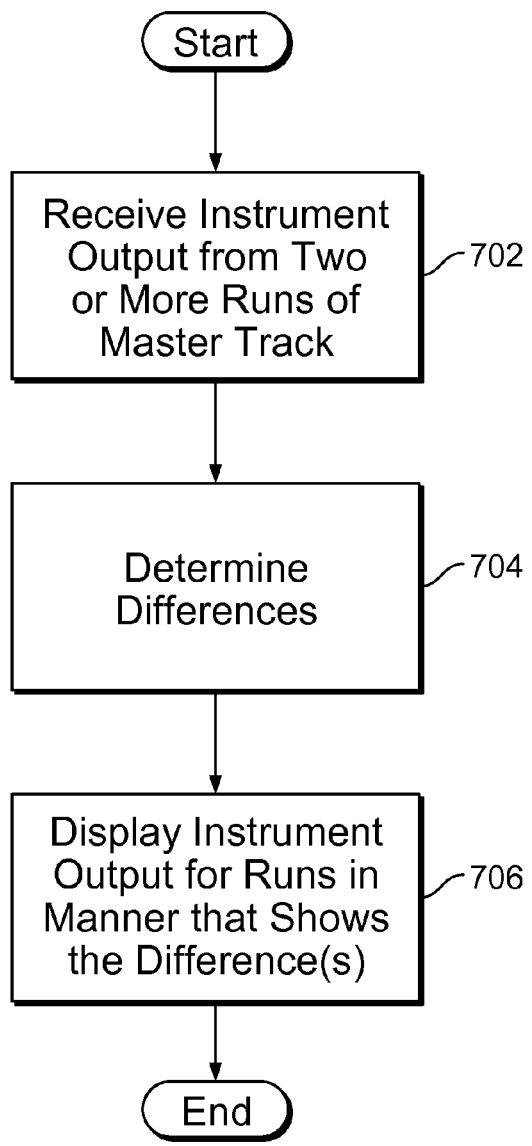
FIG. 7A is a flow chart illustrating an embodiment of a process for showing a difference between two or more tracks.

FIG. 7A is a flow chart illustrating an embodiment of a process for showing a difference between two or more tracks. The process begins at 702 when output from two or more runs of the master track are received. For example, the tracks shown at 602 in FIG. 6 are received at 702. In some embodiments, tracks are received by performing a query of event database 108. In other cases, tracks are received sequentially, in real time.

At 704, it is determined whether there are any differences between the tracks received at 702. One way of determining differences is to examine the meta-information of events with which the tracks are associated. For example, in a first run, a total of three file opens may occur, while in the second run, a total of four file opens may occur. By examining the meta-information associated with the events recorded by an instrument during two different runs, differences in execution can be detected. In some embodiments, such as when one or more flag filters such as those described in conjunction with FIG. 6 are set, tracing system 102 evaluates flagged events for differences rather than or in addition to examining the event object meta-information described above. Event database 108 in some embodiments is a relational database such as PostgreSQL, Oracle, or MySQL, and accepts SQL compatible (e.g. SQL3) queries. Thus, in some instances, advanced queries are used to determine differences.

In various embodiments, instruments are responsible for analyzing their respective data and recording summary information, such as the summary information displayed in region 402 of inter face 106 as shown in FIG. 4A. In such a case, the analysis is stored in event database 108 or another appropriate location as applicable and tracing system 102 is configured to look for the summary information when performing portion 704 of the process shown in FIG. 7A.

In some embodiments, differences are determined by the instrument. In other instances, differences are determined centrally, such as by dedicated component of tracing system 102.

At 706, the tracks received at 702 are displayed to a user in a manner that shows differences detected at 704. In some embodiments, the analysis performed at 704 is time or otherwise resource intensive. In such a case, the tracks received at 702 may be displayed immediately to a user at 706 along with an overlay or other user interaction that indicates to the user that processing is underway and any differences determined at 704 will be displayed when they are available.

In some embodiments, the tracks received at 702 and compared at 704 are tracks recorded by two or more different instruments during a single replay of the master track. Differences are determined according to rules specified to tracing system 102 such as by an administrator, e.g., via a graphical and/or other user interface and/or in a configuration file. One example of such a rule is to visually indicate any time that a temperature exceeds a certain value and that a particular file is open by visually marking both the temperature and the file open event in the output of the respective instruments monitoring such events.

Figure 7B:
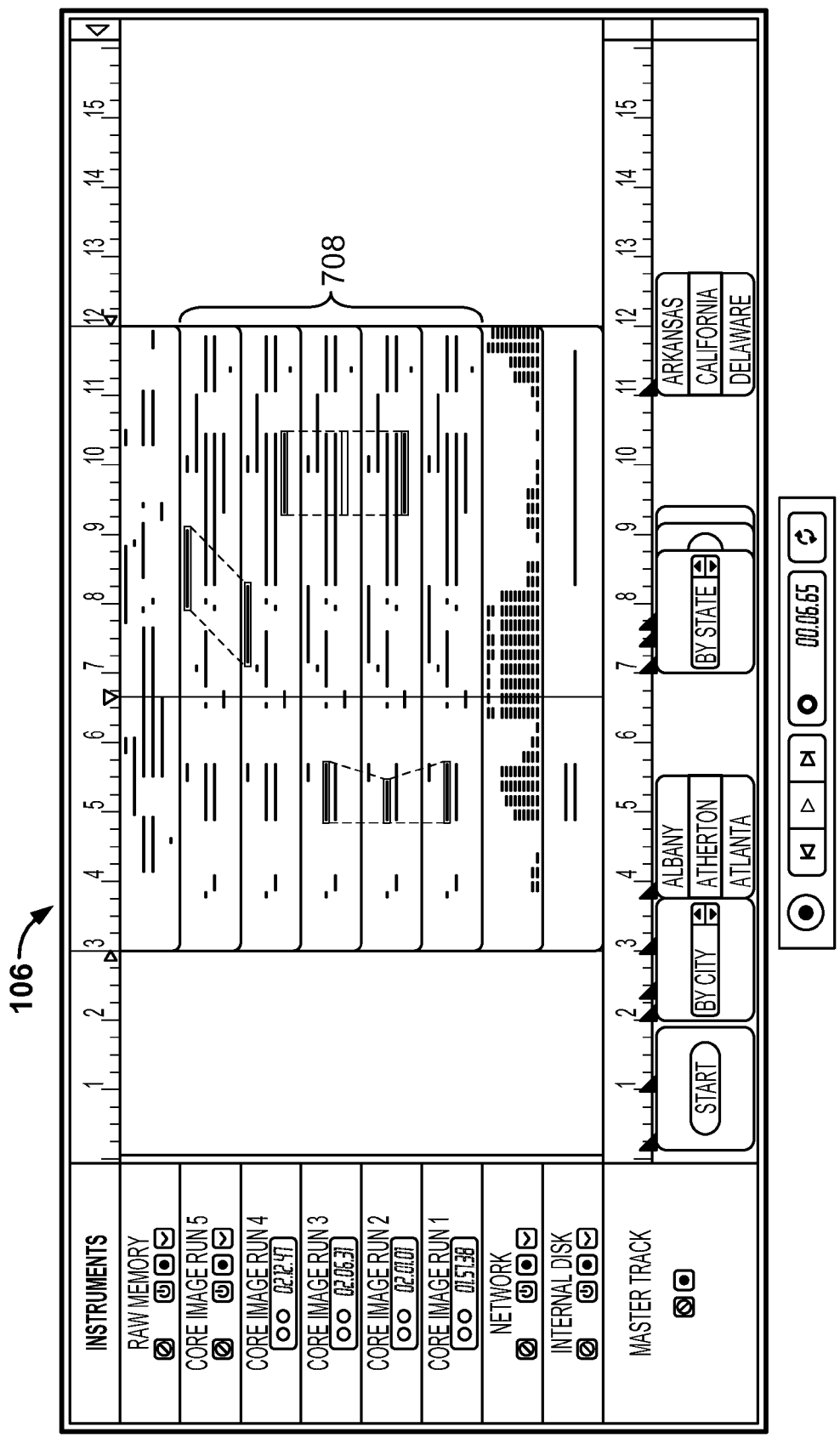
FIG. 7B illustrates an embodiment of an interface to a tracing system.

FIG. 7B illustrates an embodiment of an interface to a tracing system. In the example shown, a user has caused multiple executions of the master track to run such as by taking the actions described in conjunction with FIG. 6. The user has indicated that differences are to be determined (704) and the results of the difference determination are displayed at 702. The core image instrument is aware of information such as the size of images that it created and which filters it applied to those images. In the example shown, executions of the same set of instructions, such as "fetch image; resize image; display image" resulted in different sized images being displayed in different runs. This information is captured by the core image instrument, such as at 306 of the process shown in FIG. 3. The information is thus available for receipt at 702 and evaluation at 704 of the process shown in FIG. 7A.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of facilitating analysis comprising:
   playing a master track comprising one or more previously recorded inputs to one or more computer system components, wherein playing the master track includes providing at least one of the previously recorded inputs as a current input to an executing computer software being analyzed;
   receiving two or more sets of instrument output, each set generated during at least a corresponding portion of the playback of the master track, wherein an instrument gathers information associated with a computer resource and a set of instrument output associated with the instrument includes one or more outputs generated by the instrument in response to an input of a least one of the previously recorded inputs to the executing computer software; and
   displaying at least a selected portion of the instrument output in a manner that allows visual correlation of a displayed first portion of a first set of instrument output with one or both of a displayed corresponding portion of a second set of instrument output and a displayed corresponding portion of the master track.

2. The method of claim 1 further comprising recording the master track.

3. The method of claim 1 further comprising receiving an instrument selection.

4. The method of claim 1 further comprising configuring an instrument.

5. The method of claim 1 further comprising receiving a definition of a pre-selected set of instruments.

6. The method of claim 1 further comprising receiving a selection of a pre-selected set of instruments.

7. The method of claim 1 wherein the instrument output is displayed correlated with at least a portion of the one or more previously recorded inputs and their corresponding times.

8. The method of claim 1 wherein the instrument output is displayed as if rendered with one or more brushes.

9. The method of claim 1 further comprising displaying a detailed view of at least a portion of the instrument output.

10. The method of claim 1 wherein the instrument output comprises an event.

11. The method of claim 1 further comprising displaying event information.

12. The method of claim 1 wherein the instrument output is stored in an event database.

13. The method of claim 1 wherein the two or more sets of instrument output include two or more sets of output data generated by the same instrument during successive runs of the master track.

14. The method of claim 1 wherein the two or more sets of instrument output include two or more sets of output data generated by two or more different instruments during a run of the master track.

15. The method of claim 1 wherein the two or more sets of instrument output include two or more sets of output data generated by two or more different instances of the same instrument during a run of the master track.

16. The method of claim 1 further comprising receiving a selection of the selected portion of the instrument output.

17. The method of claim 1 further comprising correlating the instrument output based at least in part on time.

18. The method of claim 1 further comprising correlating the instrument output based at least in part on a timestamp.

19. The method of claim 1 further comprising correlating the two or more sets of instrument output based on event information associated with each of the sets of instrument output.

20. A computer system comprising:
   a display; and
   a processor coupled to the display and configured to:
   play a master track comprising one or more previously recorded inputs to one or more computer system components, wherein the processor is configured to play the master track including by providing at least one of the previously recorded inputs as a current input to an executing computer software being analyzed;
   receive two or more sets of instrument output, each set generated during at least a corresponding portion of the playback of the master track, wherein an instrument gathers information associated with a computer resource and a set of instrument output associated with the instrument includes one or more outputs generated by the instrument in response to an input of a least one of the previously recorded inputs to the executing computer software; and
   cause at least a selected portion of the instrument output to be rendered in the display in a manner that allows visual correlation of a displayed first portion of a first set of instrument output with one or both of a displayed corresponding portion of a second set of instrument output and a displayed corresponding portion of the master track.

21. A computer program product for performing analysis, the computer program product being embodied in a computer readable storage medium and comprising computer instructions for:
   playing a master track comprising one or more previously recorded inputs to one or more computer system components, wherein playing the master track includes providing at least one of the previously recorded inputs as a current input to an executing computer software being analyzed;
   receiving two or more sets of instrument output, each set generated during at least a corresponding portion of the playback of the master track, wherein an instrument gathers information associated with a computer resource and a set of instrument output associated with the instrument includes one or more outputs generated by the instrument in response to an input of a least one of the previously recorded inputs to the executing computer software; and
   displaying at least a selected portion of the instrument output in a manner that allows visual correlation of a displayed first portion of a first set of instrument output with one or both of a displayed corresponding portion of a second set of instrument output and a displayed corresponding portion of the master track.

\* \* \* \* \*